US012484777B2

(12) United States Patent
Alasaarela

(10) Patent No.: US 12,484,777 B2
(45) Date of Patent: Dec. 2, 2025

(54) OPHTHALMIC APPARATUS AND METHOD OF ALIGNMENT OF OPHTHALMIC APPARATUS

(71) Applicant: Optomed Plc, Oulu (FI)

(72) Inventor: Ilkka Alasaarela, Oulu (FI)

(73) Assignee: Optomed Plc, Oulu (FI)

( * ) Notice: Subject to any disclaimer, the term of this patent is extended or adjusted under 35 U.S.C. 154(b) by 301 days.

(21) Appl. No.: 18/496,208

(22) Filed: Oct. 27, 2023

(65) Prior Publication Data

US 2024/0138677 A1 May 2, 2024

(30) Foreign Application Priority Data

Oct. 28, 2022 (FI) .................................... 20225964

(51) Int. Cl.
*A61B 3/14* (2006.01)
*A61B 3/00* (2006.01)
(Continued)

(52) U.S. Cl.
CPC .............. *A61B 3/14* (2013.01); *A61B 3/0025* (2013.01); *A61B 3/12* (2013.01); *A61B 3/152* (2013.01);
(Continued)

(58) Field of Classification Search
CPC ........... A61B 3/14; A61B 3/0025; A61B 3/12; A61B 3/152; A61B 2560/02; A61B 3/00;
(Continued)

(56) References Cited

U.S. PATENT DOCUMENTS

2004/0189942 A1* 9/2004 Yoon ..................... A61B 3/1015
351/221
2004/0228005 A1 11/2004 Dowski et al.
(Continued)

FOREIGN PATENT DOCUMENTS

EP 1321095 A2 6/2003
EP 1 978 394 10/2008
(Continued)

OTHER PUBLICATIONS

May 15, 2024 Search Report issued in Finnish Patent Application No. 20236197, pp. 1-2.
(Continued)

*Primary Examiner* — Mohammed A Hasan
(74) *Attorney, Agent, or Firm* — Nixon & Vanderhye PC

(57) ABSTRACT

An ophthalmic apparatus comprises an illumination channel for illuminating a retina of an eye in response to a distance between the ophthalmic apparatus and the eye being within a working range of the ophthalmic apparatus. An imaging channel collects light reflected from the retina. An image capturing arrangement captures images of the retina through the imaging channel while the distance between the ophthalmic apparatus and the eye is within a working range of the ophthalmic apparatus. A chromatic arrangement causes and/or imitates a longitudinal chromatic aberration of light directed toward an eye while a longitudinal aberration range is at least partially overlapping with a frontal section of an eye between an outer surface of a cornea and a rear surface of a crystalline lens in response to a distance between the ophthalmic apparatus and the eye being within a working range. A collection optics collects light reflected from the frontal section of the eye. An optical spectrum analyzer outputs signals, a single signal of the signals carrying information on intensity of a single wavelength band of the different wavelength bands. A data processing unit measures (Continued)

intensities carried by the signals and determines a distance and/or a need for adjustment of the distance between the ophthalmic apparatus and the eye based on peak(s) of the signals, the peaks being caused by reflections from at least one surface of the eye.

6 Claims, 4 Drawing Sheets

(51) Int. Cl.
 *A61B 3/12* (2006.01)
 *A61B 3/15* (2006.01)
 *G06T 7/00* (2017.01)
(52) U.S. Cl.
 CPC ........ *G06T 7/0012* (2013.01); *A61B 2560/02* (2013.01); *G06T 2207/30041* (2013.01)
(58) Field of Classification Search
 CPC ............... A61B 3/13; G06T 7/0012; G06T 2207/30041; G06T 2207/10024; G06T 5/73; G02B 27/0025; G02B 27/0075
 USPC ........................................................ 351/206
 See application file for complete search history.

(56) References Cited

U.S. PATENT DOCUMENTS

| | | |
|---|---|---|
| 2005/0225725 A1 | 10/2005 | Warden et al. |
| 2011/0242372 A1 | 10/2011 | Kosaka |
| 2015/0070655 A1* | 3/2015 | Rossi ................. G02B 21/0076 351/246 |
| 2018/0055358 A1* | 3/2018 | Nakajima ................ A61B 3/15 |
| 2018/0136486 A1 | 5/2018 | Macnamara et al. |
| 2020/0054211 A1* | 2/2020 | Ohmura ................. A61B 3/102 |
| 2022/0057651 A1 | 2/2022 | Segre et al. |
| 2022/0386868 A1* | 12/2022 | Ono ......................... A61B 3/12 |
| 2023/0359008 A1* | 11/2023 | Shimizu ............. G02B 21/0028 |

FOREIGN PATENT DOCUMENTS

| | | |
|---|---|---|
| EP | 2 786 699 | 10/2014 |
| WO | 96/41123 | 12/1996 |
| WO | 2008000008 A2 | 1/2008 |
| WO | 2018152596 A1 | 8/2018 |
| WO | 2020010138 A1 | 1/2020 |
| WO | 2020/231894 | 11/2020 |
| WO | 2022/011420 | 1/2022 |

OTHER PUBLICATIONS

May 15, 2024 Office Action issued in Finnish Patent Application No. 20236197, pp. 1-5.

Finland Search Report for FI20225964 dated May 11, 2023, 4 pages.

May 29, 2024 Office Action issued in Finnish Patent Application No. 20236198, pp. 1-7.

* cited by examiner

OPHTHALMIC APPARATUS AND METHOD OF ALIGNMENT OF OPHTHALMIC APPARATUS

CROSS-REFERENCE TO RELATED APPLICATION

This application claims priority to FI 20225964 filed Oct. 28, 2022, the entire contents of which are hereby incorporated by reference.

FIELD

The invention relates to an ophthalmic apparatus method of alignment of an ophthalmic apparatus.

BACKGROUND

Capturing sharp and reflection free images from the retina of a patient under examination of an eye is challenging due to movement of patient and patient's eye, eye refractive errors such as myopia or hyperopia, and eye accommodation, which may quickly change both the alignment and the focus as a function of time, for example. Additionally, fundus imaging is challenging and good quality images to resolve maximum number of details from retina are hard to capture. Hence, a new approach to the eye examination would be welcome.

BRIEF DESCRIPTION

The present invention seeks to provide an improvement in the ophthalmic examination.

The invention is defined by the independent claims. Embodiments are defined in the dependent claims.

If one or more of the embodiments is considered not to fall under the scope of the independent claims, such an embodiment is or such embodiments are still useful for understanding features of the invention.

LIST OF DRAWINGS

Example embodiments of the present invention are described below, by way of example only, with reference to the accompanying drawings, in which FIG. 1 illustrates an example where an aperture is projected as a light spot on a frontal part of the eye while the spot has spectral spread in a direction of the optical axis;

DESCRIPTION OF EMBODIMENTS

Figure 1:
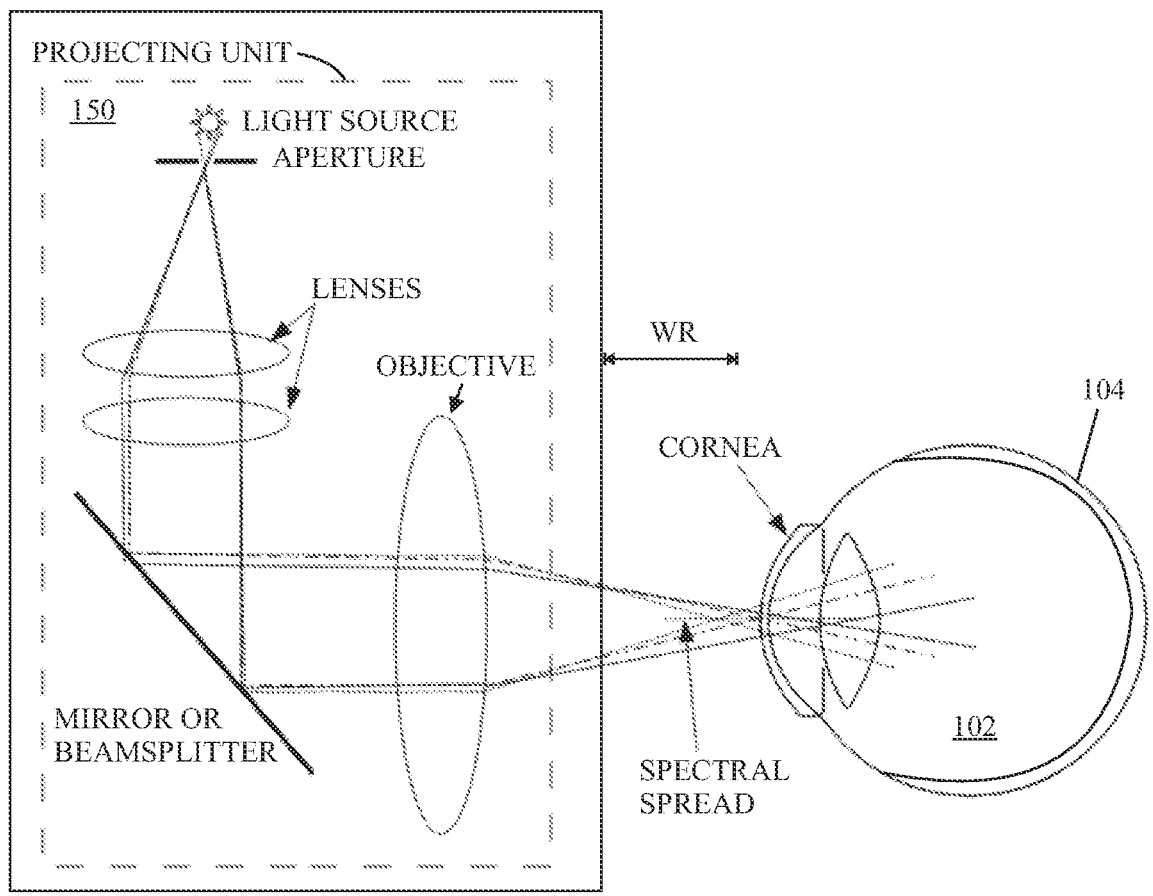

The following embodiments are only examples. Although the specification may refer to "an" embodiment in several locations, this does not necessarily mean that each such reference is to the same embodiment(s), or that the feature only applies to a single embodiment.

The articles "a" and "an" give a general sense of entities, structures, components, compositions, operations, functions, connections or the like in this document. Note also that singular terms may include pluralities.

Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments are considered possible if their combination does not lead to structural or logical contradiction.

The term "about" means that quantities or any numeric values are not exact and typically need not be exact. The reason may be tolerance, resolution, measurement error, rounding off or the like, or a fact that the feature of the solution in this document only requires that the quantity or numeric value is approximately that large. A certain tolerance is always included in real life quantities and numeric values.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

Note that in optics the explanation of the optical operation does not necessarily refer to the actual propagation direction of light. That means, light may in reality travel either in the same direction as described in the explanation or in the opposite direction to that of the explanation describing the optical operation based on rays or beams.

The term "comprise" (and grammatical variations thereof) and the term "include" should be read as "comprise without limitation" and "include without limitation", respectively.

"Lens" means a single lens, compound lens or set of lenses. For example, an achromatic doublet is a lens.

In this document, the standard eye may be based on an Emsley model, Emsley-Gullstrand model, or Liou and Brennan schematic eye model, for example. The eye model may be similar to an anatomical and optical eye. It may have a power of about 60.4 D and an axial length of about 24 mm for example. The eye model may estimate aberrations in a visible range of light. The eye model used in the ophthalmic examination apparatus during an examination may have variation depending on a size of a person that is examined, sex and age especially when it is a question of a child, for example. That is, a model may be selected based on anatomical and/or optical information on the person to be examined.

The imaging channel refers to a path of light through which the light from the retina 104 travels to detection performed in the ophthalmic apparatus. The imaging channel includes, or the light travelling within the optical channel is affected by, optical components, which may be comprise lenses and/or mirrors, for example.

The illumination channel refers to a path of light through which the light from a light source travels to the retina 104.

The illumination channel includes, or the light traveling within the illumination path is affected by optical components which may comprise lenses and/or mirrors, for example.

The light directed to the eye 102 through the illumination channel and/or the light received through the imaging channel may include infrared light and/or visible light. The light directed to the eye 102 through the illumination channel and/or the light received through the imaging channel may include only infrared light and/or only visible light.

The infrared light may comprise light with wavelengths ranging from about 700 nm to about 1200 nm, for example, or ranging from about 800 nm to about 1000 nm for example. The visible light may comprise light with wavelengths ranging from about 370 nm to about 800 nm for example, or ranging from about 400 nm to about 700 nm, for example.

Fundus camera may have field-of-view more than about 20° for example, or more than about 40° for example.

The ophthalmic apparatus comprises an image capturing arrangement 106 that captures one or more images of the retina 104 through the imaging channel while the distance between the ophthalmic apparatus and the eye 102 is within a working range WR of the ophthalmic apparatus. The image capturing arrangement 106 may comprise a digital camera, for example. The image capturing arrangement 106 may comprise a CCD (charge-coupled device) and/or CMOS (complementary metal-oxide-semiconductor) camera, for example.

In order to get good quality images from retina, an ophthalmic apparatus such as a fundus camera needs to be aligned to optimal axial distance from eye, i.e. to the optimal working range WR. This is challenging and requires improvements.

A measurement of an axial position of an eye 102 in a fundus camera can be based on axial color. As depicted in FIG. 1, a projection unit, which is an illumination arrangement 150, comprises a light source, an aperture, and at least one optical element such as lens, mirror, diffractive optical element, for example. At least a portion of the light emitted from the light source is arranged to pass the aperture. The optical elements of the illumination arrangement 150 project the aperture to on a frontal part of the eye 102, so that the image of the aperture, which appears as a light spot at the frontal part of the eye 102, has spectral spread in an axial direction. The axial direction may refer to an optical axis of the illumination arrangement 150.

The light source may be for example a LED (light emitting diode), an organic light emitting diode, a light-emitting plasma, a laser, an incandescent lamp, a halogen lamp, an arc lamp (such as, for example, a xenon arc lamp), a fluorescent lamp, or any other lamp that emits suitable wavelengths and has other properties suitable for the device.

The spectral spread can be achieved by selecting the glass materials and curvatures of the lenses that cause an axial color aberration in the spot imaging, for example. Diffractive optical elements may be used to increase or modify the shape of the spectral spread, too. Still alternatively a spectrograph may be used to cause spectral spread of the spot axially.

The light may get partially reflected from one or several optical interfaces of the frontal part of the eye 102, such as a cornea surfaces and an anterior side surface of a crystalline lens and a posterior side surface of a crystalline lens, for example.

The length of the spectral spread may be for example between about 4 mm and about 10 mm, or for example between about 5 mm and about 8 mm, in air.

The light may contain wavelengths ranging from visible to near-infrared, for example. The near-infrared light can be used to avoid contraction of an iris of the eye 102. The spectral spread may cover wavelengths ranging for example from about 400 mm to about 1100 nm, or for example from about 800 mm to about 1000 nm.

Examine now reflection from one optical interface in more detail. Without loss of generality, assume that the reflecting interface is the outer i.e. frontal surface of the cornea.

The reflected light comprises a plurality or a continuum of wavelengths, but only that part of the spectrum, which has focus close to the cornea, gives strong signal on the sensor. That known difference of focuses between the wavelengths is used to determine a position of the cornea within the spectrally spread spot, and followingly in respect to the ophthalmic apparatus such as the fundus camera.

Figure 2:
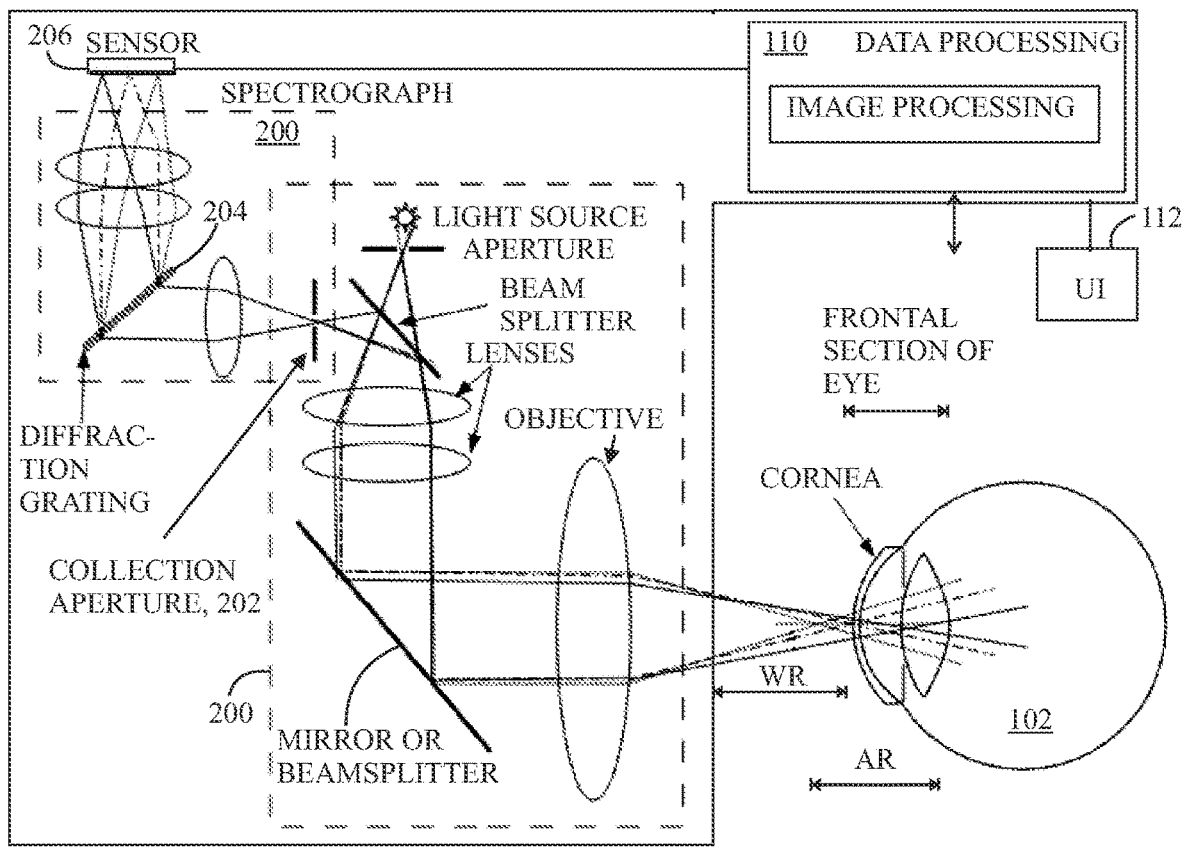
FIG. 2 illustrates an example where the ophthalmic apparatus comprises a spectrograph for determining need of alignment based on the spectral spread illustrated in FIG. 1.

As shown in FIG. 2, the reflected light can be collected by using partially the same optics as the projection unit, for example, but the collected beam can be guided by using a beamsplitter to a collection aperture 202, and from it to an optical spectrum analyzer 200, which may detect intensities of light as function of wavelengths of light. In an embodiment, the spectrum analyzer may spread the spectral content of the collected light to spectrograph sensor 206. The sensor 206 may be a CMOS or CCD sensor, for example. The sensor 206 may be line or matrix array, for example. The sensor 206 may comprise one or more silicon detectors for example, which may be arranged in a row for example. The collection beam approximately matches with the projection beam at the eye side of the objective. Now, the power of the reflected light which can pass the collection aperture 202 is strongest at those wavelengths where the spot is focused on the cornea.

At each wavelength, there is a spot in the spectrally spread spot in front part of the eye, which is conjugate of the (illumination) aperture. The same applies to the collection aperture 202. The collection optics is arranged such a way, that the collection aperture 202 is conjugate of the same spot, at the same wavelength, as the (illumination) aperture.

Figure 3:
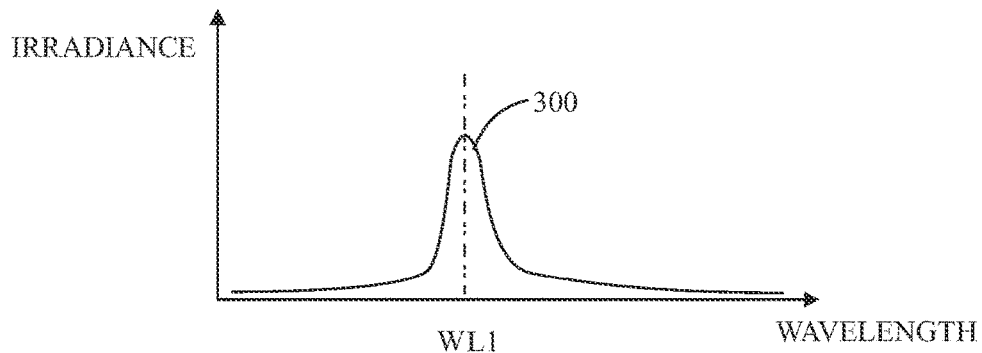
FIG. 3 shows an example of intensity detected by the spectrograph of FIG. 2.

FIG. 3 shows an example of intensity on the spectrograph sensor 206 as a function of wavelength. Due to the spectral spread of the focus, the wavelength axis corresponds to z-axis, i.e. axial position in the spectral spread. The intensity is highest at wavelength WL1, which tells that the cornea is located at the position of the peak wavelength in the spectral spread. The axial positions of different wavelengths on the spectral spread may be known in respect to the ophthalmic apparatus such as the fundus camera by calibration. Therefore, by analyzing the peak wavelength from the spectral content of the reflected light we can get the axial position of the cornea in respect to the ophthalmic apparatus such as the fundus camera.

Figure 4:
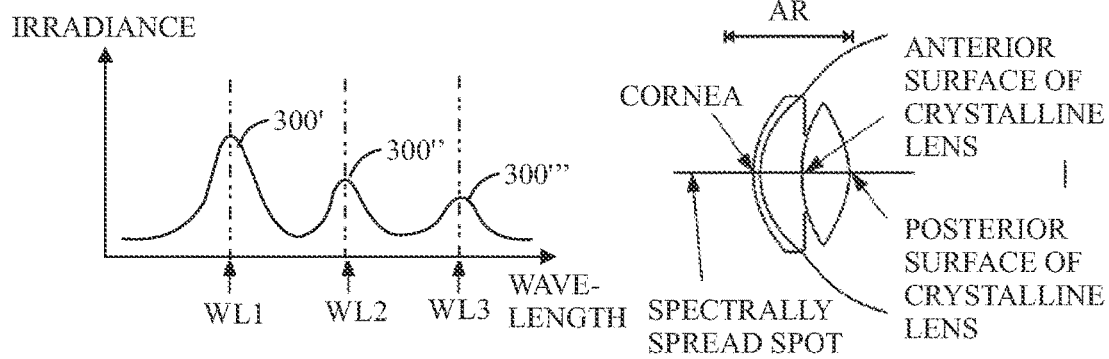
FIG. 4 illustrates an example of dependence of peaks intensity detected by the spectrograph and surfaces of an anterior part of the eye.

The spectral spread of the spot can extend all way from the cornea to the crystalline lens. The light may reflect from several optical interfaces at frontal part of the eye 102. FIG. 4 shows an example of a signal of the spectrograph sensor 206 as a function of wavelength, showing three peaks at wavelengths WL1, WL2, and WL3, indicating positions of the cornea, the crystalline lens anterior side surface, and the crystalline lens posterior side surface, respectively.

Another exemplary embodiment for determining for example the cornea position, is to arrange detection of the reflected light by the following way: At least part of the reflected light is captured and imaged, or focused, to a detection unit. The detection unit may comprise at least one detector element which is arranged to detect light by a certain restricted wavelength band. That spectral selection can be arranged. by using spectral filtering or by utilizing dispersion in order to guide different wavelengths to different directions and/or locations, for example. The at least one detection unit may be arranged to indicate if reflection is captured close to the axial distance where the selected wavelength band is in focus. The detection unit may further comprise an aperture, which is arranged to a location which is conjugate to a known position on the spectrally spread spot, which corresponds to the selected narrow wavelength band. This further enhances the signal sensitivity to reflections from a certain axial position.

Instead of or in addition to a spot, a line or any other image may be projected to the frontal part of the eye 102, spectrally spread axially similar to the above-described spot. The illumination aperture and the collection aperture 202 may have the same shape, i.e. they both can be for example circular holes or straight slits.

The detection of the spectrum of reflected light, which gets passed by the collection aperture 202, can be made by a spectrograph and a sensor array, a spectrometer, a tunable optical filter and a sensor array, or a filter matrix and a sensor array, or a filter wheel and a sensor, for example.

The spectrally spread spot may not be continuous, i.e. it may have optical power only in those wavelength regions, from which reflection detection is needed for determining the optimal working distance.

Similarly, at the detection side, it may not be necessary to detect light from the whole spectrum of the spectrally spread spot, but it may be enough to detect light only from those wavelength regions, from which reflection detection is needed for determining the optimal working distance.

The accuracy of the axial position determination by the described method may be adjusted by varying the numerical aperture NA of the spectrally spread spot. The NA can be for example between about 0.05 and about 0.7, or for example between about 0.1 and about 0.3. The larger the NA, the more accurate is the axial position determination. The larger the NA, the more reflected light may be collected. The larger the NA, the more reflected light may be collected from offset and tilted eye, too.

FIGS. 1 and 2 illustrate examples of an ophthalmic apparatus comprises an illumination arrangement 150 for illuminating a retina 104 of an eye 102 in response to a distance between the ophthalmic apparatus and the eye 102 being within a working range (WR) of the ophthalmic apparatus. FIG. 1 illustrates only the illumination channel of the ophthalmic apparatus.

The ophthalmic apparatus comprises also an imaging channel for collecting light reflected from the retina 104. The imaging channel is shown in FIG. 2. The imaging channel may be similar to that shown in FIG. 1, for example.

The ophthalmic apparatus further comprises an image capturing arrangement not illustrated in FIGS. 1 and 2. The image capturing arrangement 106 may comprise a digital camera, for example, and it may be similar to the image capturing arrangement 106 of FIG. 1. The image capturing arrangement 106 may comprise a CCD (charge-coupled device) and/or CMOS (complementary metal-oxide-semiconductor) camera, for example.

The image capturing arrangement captures images of the retina 104 through the imaging channel when a distance between the ophthalmic apparatus and the eye 102 is within a working range (WR) of the ophthalmic apparatus.

The ophthalmic apparatus comprises a optical spectrum analyser 200 that causes or imitates a longitudinal chromatic aberration of an optical spectrum of light directed toward an eye 102 while a longitudinal aberration range AR is at least partially overlapping with a frontal section of an eye 102 between an outer surface of a cornea and a rear surface of a crystalline lens of the standard eye in response to a distance between the ophthalmic apparatus and the eye 102 being within a working range WR of the ophthalmic apparatus.

The ophthalmic apparatus comprises a collection optical arrangement that collects at least portion of the light reflected from the frontal section of the eye 102, and focuses the light to a collection aperture or slit 202. The collection optical arrangement may be at least partially common with illumination arrangement 150.

The ophthalmic apparatus comprises a spectral disperser 204 that deviates spatially different wavelength bands of the light from the aperture or slit 202. An spectrographic sensor 206 receives the wavelength bands and output signals, a single signal of the signals carrying information on intensity of a single wavelength band of the different wavelength bands.

A data processing unit 110 of the ophthalmic apparatus measures one or more intensities carried by at least one of the signals and determines a distance and/or a need for adjustment of the distance between the ophthalmic apparatus and the eye 102 based on at least one peak 300 intensity of the signals, peaks 300 being caused by reflections from at least one optical surface of the eye 102.

FIG. 3 illustrates one of the peaks 300, which represents a reflection from an surface of the eye 102.

FIG. 4 illustrates a peak 300' from the cornea, a peak 300" from an anterior surface of the crystalline lens or a peak from an iris, and a peak from a posterior surface of the crystalline lens.

In an embodiment, the data processing unit 110 may measure one or more intensities carried by the at least one of the signals and determine the distance and/or the need for adjustment of the distance between the ophthalmic apparatus and the eye 102 based on the at least one intensity peak 300, 300', 300", 300'" of the signals, the peaks peak 300, 300', 300", 300'" being caused by reflections from an outer surface of the cornea, an iris and/or the rear surface of the crystalline lens.

In an embodiment, the illumination arrangement 150 may cause or imitate the longitudinal chromatic aberration range AR that is optically longer than a distance between the outer surface of the cornea and the rear surface of the crystalline lens of the standard eye.

The data processing unit 110 with image processing processes images of the fundus of the eye 102. The user interface 112 may be utilized to show the images. The image information produced by the ophthalmic apparatus may be video or still images. The data processing unit 110 may also control and/or may be used to control operations of the ophthalmic apparatus. The user may also input data and/or commands to the ophthalmic apparatus.

Figure 5:
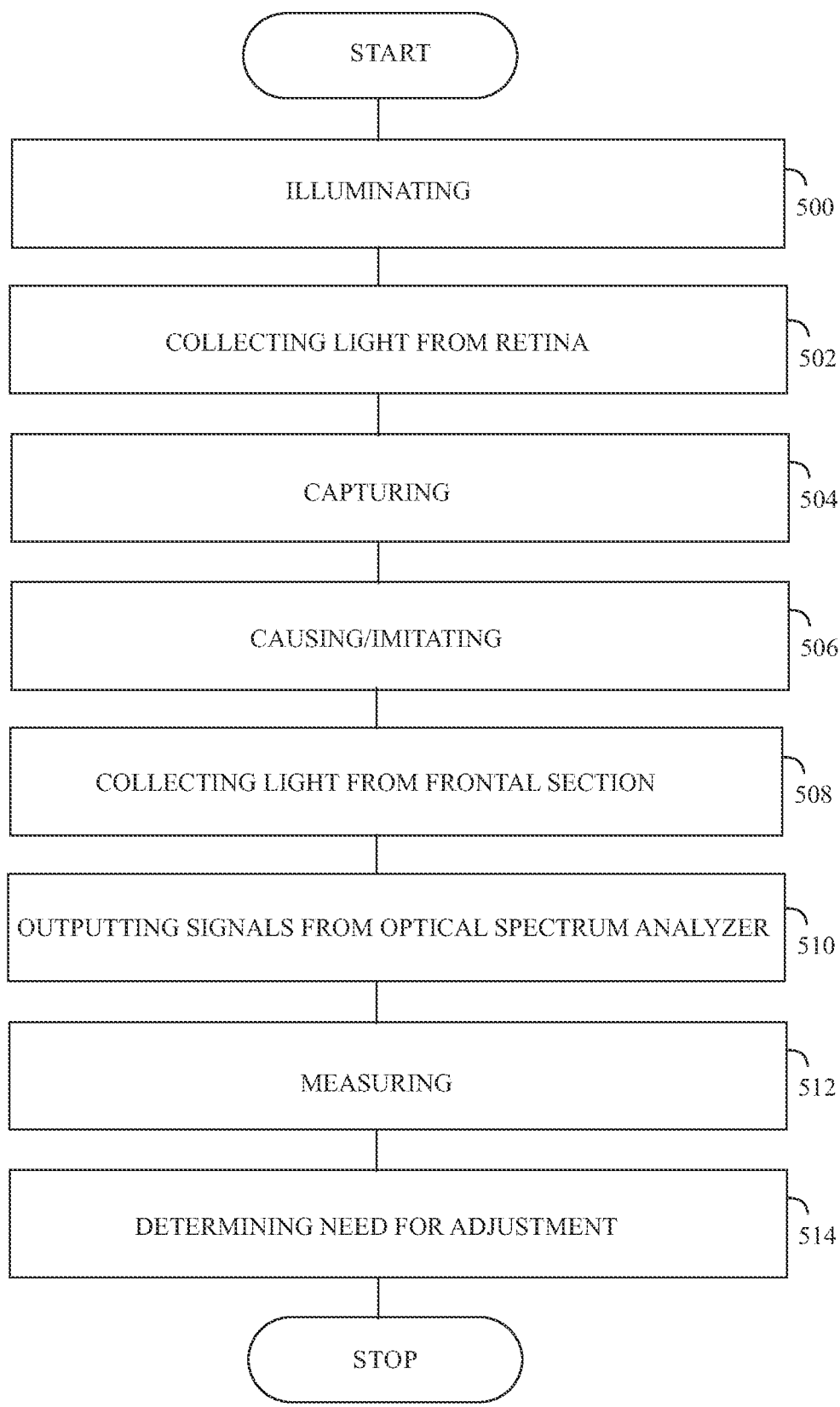
FIG. 5 illustrate an example of a flow chart of a method of alignment.

FIG. 5 illustrates an example a flow chart of a method of alignment of an ophthalmic apparatus. In step 500, a retina 104 of an eye 102 is illuminated through an illumination channel in response to a distance between the ophthalmic apparatus and the eye 102 being within a working range WR of the ophthalmic apparatus.

In step 502, collecting light reflected from the retina 104 is collected through an imaging channel;

In step 504, images of the retina 104 are captured through the imaging channel by an image capturing arrangement, while the distance between the ophthalmic apparatus and the eye 102 is within a working range W of the ophthalmic apparatus.

In step 506, a longitudinal chromatic aberration of an optical spectrum of light directed toward an eye 102 is caused and/or imitated by a chromatic arrangement, while a longitudinal aberration range AR is at least partially overlapping with a frontal section of an eye 102 between an outer surface of a cornea and a rear surface of a crystalline lens of a standard eye in response to a distance between the ophthalmic apparatus and the eye 102 being within a working range WR of the ophthalmic apparatus.

In step 508, at least portion of the light reflected from the frontal section of the eye 102 is collected and focused the light to a collection aperture or slit 202 by a collection optics.

In step 510, signals are output by an optical spectrum analyzer 200, a single signal of the signals carrying information on intensity of a single wavelength band of the different wavelength bands.

In step 512, one or more intensities carried by at least one of the signals are measured by a data processing unit 110.

In step 514, a distance and/or a need for adjustment of the distance between the ophthalmic apparatus and the eye 102 are determined based on at least one peak intensity of the signals by the data processing unit 110, the peaks being caused by reflections from at least one surface of the eye 102.

Figure 6:
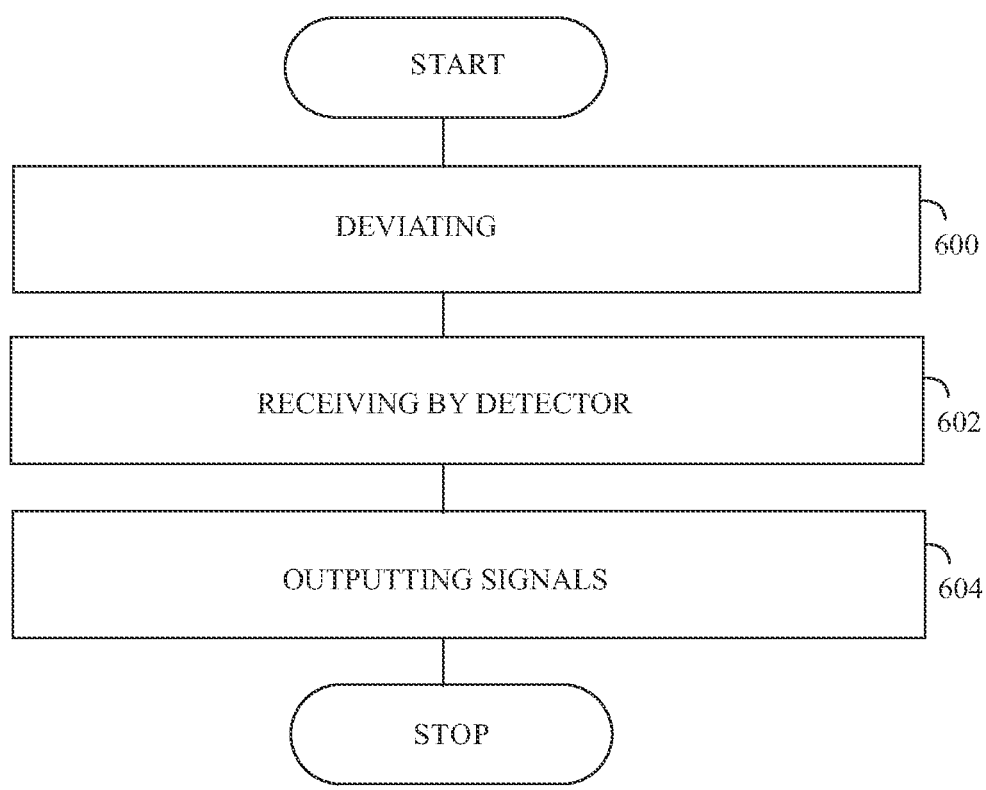
FIG. 6 illustrates an example of a flow chart of spectral dispersion.

FIG. 6 illustrates an example a flow chart of a method of dispersion. In step 600, different wavelength bands of the light from the aperture or slit 202 are deviated spatially by a spectral disperser 204.

In step 602 the wavelength bands are received by an spectrographic sensor 206.

In step 604, signals, a single signal of the signals carrying information on intensity of a single wavelength band of the different wavelength bands, are output by the spectrographic sensor 206.

In this document and related to the data processing unit 110 and the image processing, the term "computer" includes a computational device that performs logical and arithmetic operations. For example, a "computer" may comprise an electronic computational device, such as an integrated circuit, a microprocessor, a mobile computing device. A "computer" may comprise a central processing unit, an ALU (arithmetic logic unit), a memory unit, and a control unit that controls actions of other components of the computer so that steps of a computer program are executed in a desired sequence. A "computer" may also include at least one peripheral unit that may include an auxiliary memory (such as a disk drive or flash memory), and/or may include data processing circuitry.

The user interface 112 means an input/output device and/or unit. Non-limiting examples of a user interface include a touch screen, other electronic display screen, keyboard, mouse, microphone, display screen, speaker, and/or projector for projecting a visual display.

In this document, illumination and imaging of the retina 104 may be understood to mean in general illumination and imaging of the fundus of the eye 102.

It will be obvious to a person skilled in the art that, as technology advances, the inventive concept can be implemented in various ways. The invention and its embodiments are not limited to the example embodiments described above but may vary within the scope of the claims.

The invention claimed is:

1. An ophthalmic apparatus, wherein the ophthalmic apparatus comprises
an illumination channel for illuminating a retina of an eye in response to a distance between the ophthalmic apparatus and the eye being within a working range of the ophthalmic apparatus;
an imaging channel for collecting light reflected from the retina;
an image capturing arrangement for capturing images of the retina through the imaging channel while the distance between the ophthalmic apparatus and the eye is within a working range of the ophthalmic apparatus; and
a chromatic arrangement configured to cause and/or imitate a longitudinal chromatic aberration of an optical spectrum of light directed toward an eye while a longitudinal aberration range is at least partially overlapping with a frontal section of an eye between an outer surface of a cornea and a rear surface of a crystalline lens of a standard eye in response to a distance between the ophthalmic apparatus and the eye being within a working range of the ophthalmic apparatus;
a collection optics configured to collect at least portion of the light reflected from the frontal section of the eye, and focus the light to a collection aperture or slit;
an optical spectrum analyzer; configured output signals, a single signal of the signals carrying information on intensity of a single wavelength band of the different wavelength bands; and
a data processing unit configured to measure one or more intensities carried by at least one of the signals and determine a distance and/or a need for adjustment of the distance between the ophthalmic apparatus and the eye based on at least one peak intensity of the signals, peaks being caused by reflections from at least one surface of the eye.

2. The ophthalmic apparatus of claim 1, wherein a data processing unit is configured to measure one or more intensities carried by the at least one of the signals and determine the distance and/or the need for adjustment of the distance between the ophthalmic apparatus and the eye based on the at least one peak intensity of the signals, the peaks being caused by reflections from an outer surface of the cornea, an iris and/or the rear surface of the crystalline lens.

3. The apparatus of claim 1, wherein the optical illuminating arrangement is configured to cause or imitate the longitudinal chromatic aberration range that is optically longer than a distance between the outer surface of the cornea and the rear surface of the crystalline lens of a standard eye.

4. The apparatus of claim 1, wherein a spectral disperser of the optical spectrum analyzer is configured to deviate spatially different wavelength bands of the light from the aperture or slit, and an spectrographic sensor configured to receive the wavelength bands and output signals, a single signal of the signals carrying information on intensity of a single wavelength band of the different wavelength bands.

5. A method of alignment of an ophthalmic apparatus, the method comprising
illuminating through an illumination channel a retina of an eye in response to a distance between the ophthalmic apparatus and the eye being within a working range of the ophthalmic apparatus;
collecting through an imaging channel light reflected from the retina;

capturing, by an image capturing arrangement, images of the retina through the imaging channel while the distance between the ophthalmic apparatus and the eye is within a working range of the ophthalmic apparatus; and causing and/or imitating, by a chromatic arrangement, a longitudinal chromatic aberration of an optical spectrum of light directed toward an eye while a longitudinal aberration range is at least partially overlapping with a frontal section of an eye between an outer surface of a cornea and a rear surface of a crystalline lens of a standard eye in response to a distance between the ophthalmic apparatus and the eye being within a working range of the ophthalmic apparatus;

collecting, by a collection optics, at least portion of the light reflected from the frontal section of the eye, and focusing the light to a collection aperture or slit by the collection optics;

outputting signals, a single signal of the signals carrying information on intensity of a single wavelength band of the different wavelength bands, by an optical spectrum analyzer; and measuring, by a data processing unit, one or more intensities carried by at least one of the signals;

determining, by the data processing unit, a distance and/or a need for adjustment of the distance between the ophthalmic apparatus and the eye based on at least one peak intensity of the signals, the peaks being caused by reflections from at least one surface of the eye.

6. The method of claim 5, the method further comprising deviating, by a spectral disperser of the optical spectrum analyzer, spatially different wavelength bands of the light from the aperture or slit, and receiving, by a spectrographic sensor, the wavelength bands and output signals, a single signal of the signals carrying information on intensity of a single wavelength band of the different wavelength bands.

* * * * *